United States Patent
Ranalli et al.

(10) Patent No.: US 11,271,978 B2
(45) Date of Patent: Mar. 8, 2022

(54) PERSONALIZED MEETING SUMMARIES

(71) Applicant: INTERNATIONAL BUSINESS MACHINES CORPORATION, Armonk, NY (US)

(72) Inventors: Gina Ranalli, Columbus, OH (US); Emily Regina Waldrop, Columbus, OH (US); Jaime Mae Stockton, Groton, MA (US); Paul R. Bastide, Ashland, MA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 16/578,553

(22) Filed: Sep. 23, 2019

(65) Prior Publication Data

US 2021/0092168 A1    Mar. 25, 2021

(51) Int. Cl.
| | |
|---|---|
| *H04L 65/403* | (2022.01) |
| *G06F 16/93* | (2019.01) |
| *H04M 3/56* | (2006.01) |
| *H04L 67/50* | (2022.01) |
| *H04L 12/18* | (2006.01) |
| *G06F 16/34* | (2019.01) |
| *G06Q 10/10* | (2012.01) |

(52) U.S. Cl.
CPC .......... *H04L 65/403* (2013.01); *G06F 16/345* (2019.01); *G06F 16/93* (2019.01); *G06Q 10/109* (2013.01); *H04L 12/1822* (2013.01); *H04L 12/1831* (2013.01); *H04L 67/22* (2013.01); *H04M 3/567* (2013.01)

(58) Field of Classification Search
USPC ...... 709/204, 205; 705/7.13; 348/14.02–14.9
See application file for complete search history.

(56) References Cited

U.S. PATENT DOCUMENTS

| | | |
|---|---|---|
| 9,560,152 B1 | 1/2017 | Jamdar |
| 9,824,333 B2 | 11/2017 | Shaw |
| 10,089,290 B2 | 10/2018 | Grueneberg |
| 10,915,570 B2 * | 2/2021 | Ramamurthy ...... G06F 16/3326 |

(Continued)

OTHER PUBLICATIONS

Mehdad et al., "Abstractive Meeting Summarization with Entailment and Fusion", Proceedings of the 14th European Workshop on Natural Language Generation, pp. 136-146,Sofia, Bulgaria, Aug. 8-9, 2013.c©2013 Association for Computational Linguistics.

(Continued)

*Primary Examiner* — Maria El-Zoobi
(74) *Attorney, Agent, or Firm* — John Noh

(57) ABSTRACT

A method, a computer program product, and a computer system generate personalized meeting summaries. The method includes identifying a participant attending a meeting associated with a purpose. The method includes determining role information of the participant. The role information indicates a role type that the participant provides toward the purpose. The method includes monitoring discussions of the meeting. The method includes generating a personalized meeting summary for the participant. The personalized meeting summary includes a summary section describing portions of the discussions that are directed to the role type of the participant.

17 Claims, 6 Drawing Sheets

(56) References Cited

U.S. PATENT DOCUMENTS

| | | | |
|---|---|---|---|
| 2004/0249884 A1* | 12/2004 | Caspi | H04M 3/42221 |
| | | | 709/204 |
| 2008/0216023 A1* | 9/2008 | Berglund | G06F 16/9566 |
| | | | 715/855 |
| 2013/0191452 A1* | 7/2013 | Beerse | H04L 65/403 |
| | | | 709/204 |
| 2013/0290434 A1 | 10/2013 | Bank | |
| 2013/0325972 A1* | 12/2013 | Boston | G06K 9/00751 |
| | | | 709/206 |
| 2014/0306817 A1 | 10/2014 | Ricci | |
| 2020/0311122 A1* | 10/2020 | Ramamurthy | G06F 16/433 |
| 2020/0403817 A1* | 12/2020 | Daredia | G10L 15/083 |

OTHER PUBLICATIONS

Mell et al., "The NIST Definition of Cloud Computing", National Institute of Standards and Technology, Special Publication 800-145, Sep. 2011, pp. 1-7.

Way et al., "Proceedings of the 49th Annual Meeting of the Association for Computational Linguistics: Tutorial Abstracts", https://www.aclweb.org/anthology/P11-5, Jun. 2011, pp. 1-17.

* cited by examiner

PERSONALIZED MEETING SUMMARIES

BACKGROUND

The exemplary embodiments relate generally to meetings, and more particularly to generating a personalized meeting summary for each participant of a meeting.

A person may attend a meeting in person where a plurality of people convenes at a location at a set time. With the introduction of web-based technology, a person may attend further meetings regardless of location. In the meeting, there may be a plurality of people where each person participating in the meeting contributes toward a goal of the meeting. For example, in a project development environment, the participants of the meeting may be part of a project in which each participant may have a skill set that allows completion of the project. However, the participants may discuss a variety of topics during the meeting that introduces a substantially large amount of information to be absorbed and retained by each participant. With regard to an individual participant, only a portion of the information may be relevant. Furthermore, meetings may be scheduled in a way that a select participant may not be able to attend, arrive late, or leave early. For durations of the meeting that the select participant is absent, there may still be discussions pertaining to the select participant. Therefore, the select participant may not have access to this information unless another participant were to provide the information of the missed durations at a subsequent time or the select participant were to use more time in reviewing a transcript or recording of the meeting. In addition, with the vast amount of information that may be discussed during the meeting, the participants may discuss a goal in which tasks are distributed. There may be instances when tasks may be identified but not distributed or improperly distributed. The task may also be lost as the meeting progresses and further topics are discussed.

SUMMARY

The exemplary embodiments disclose a method, a computer program product, and a computer system for generating personalized meeting summaries. The method comprises identifying a participant attending a meeting associated with a purpose. The method comprises determining role information of the participant. The role information indicates a role type that the participant provides toward the purpose. The method comprises monitoring discussions of the meeting. The method comprises generating a personalized meeting summary for the participant. The personalized meeting summary includes a summary section describing portions of the discussions that are directed to the role type of the participant.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
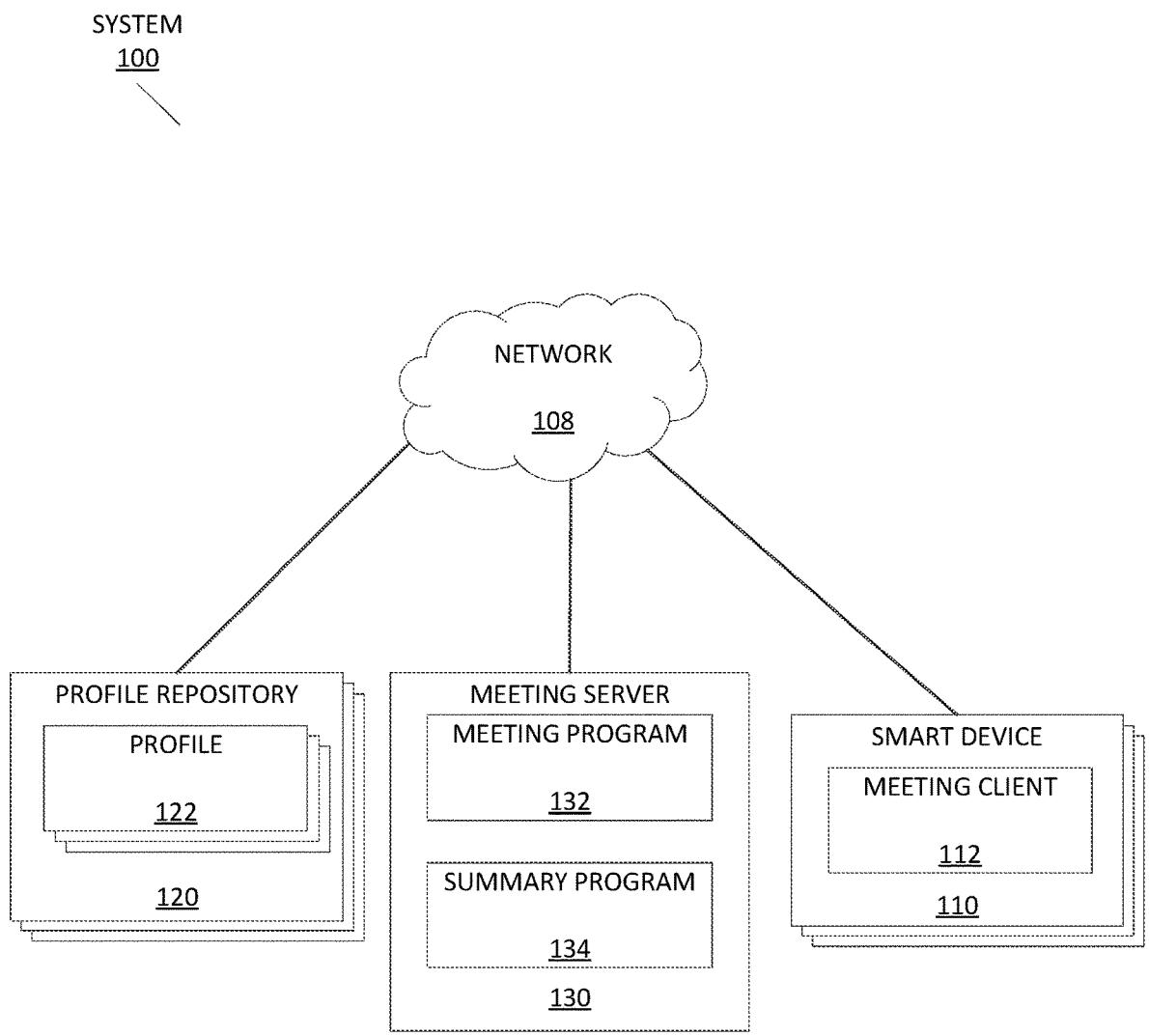
FIG. 1 depicts an exemplary schematic diagram of a meeting summary system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for generating personalized meeting summaries for participants of a meeting based on respective roles associated with the participants. As will be described in greater detail herein, the exemplary embodiments are configured to generate the personalized meeting summary based on characteristics of the participants regarding their role. The exemplary embodiments provide a mechanism to monitor the meeting as the meeting progresses and identify various types of information that are discussed. Based on the role of the participants and the information identified in the meeting, the exemplary embodiments may generate the personalized meeting summary that is specific to an individual participant, particularly for portions of the meeting that may be missed. Key benefits of the exemplary embodiments may include improving a personalization and perspective of missed content and receiving participant specific information that may be pertinent and/or relevant to the participant's role. Detailed implementation of the exemplary embodiments follows.

Conventional approaches to managing meetings attended by a participant may allow participants to review topics discussed in the meetings. For example, a conventional approach may entail a meeting digest including a plurality of meeting summaries to be provided to a participant. The conventional approach may edit the digest where discussions from participants relating to topics of interest are retained while discussions from participants relating to irrelevant topics are omitted. In another example, a conventional approach may determine socially connected groups among participants of meetings so that an overlap in interests or topics may identify whether a captured meeting is to be provided to a participant. In a further example, a conventional approach may generate a meeting summary based on a prioritization of interest preferences. However, in each of these conventional approaches, a role of the participant in the meeting is not incorporated into the mechanism with which a personalized meeting summary is generated.

The exemplary embodiments are described with regard to utilizing information related to a role of the participant in generating personalized meeting summaries. However, the exemplary embodiments may utilize any characteristic of the participant in generating the personalized meeting summaries that relate to tasks to be achieved for a purpose for which the meeting is held. For example, in addition to a role, the characteristics of the participants may be any expertise, skill set, experience, personality trait, association, member status, historical link, etc. that may indicate a potential contribution toward the purpose.

FIG. 1 depicts a meeting summary system 100, in accordance with the exemplary embodiments. According to the exemplary embodiments, the meeting summary system 100 may include one or more smart devices 110, one or more profile repositories 120, and a meeting server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the meeting summary system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the meeting summary system 100 that do not utilize the network 108.

In the exemplary embodiments, the smart device 110 may include a meeting client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the meeting client 112 may act as a client in a client-server relationship and may be a software, hardware, and/or firmware based application capable of joining a meeting via the network 108. In embodiments, the meeting client 112 may operate as a user interface allowing a participant to interact with one or more components of the meeting summary system 100, and utilize various wired and/or wireless connection protocols for data transmission and exchange associated with joining the meeting, including Bluetooth, 2.4 gHz and 5 gHz internet, near-field communication, Z-Wave, Zigbee, etc. The meeting client 112 may also be configured to receive a personalized meeting summary to be displayed for a participant associated with the smart device 110.

When the smart device 110 is associated with a participant, the meeting client 112 may be configured to provide, to the participant, a user interface of the meeting that is being joined. For example, the meeting client 112 may generate a video and/or audio interface. The video interface may allow the participant of the smart device 110 to view other participants of the meeting and/or transmit a view of the participant to the other participants while the audio interface may allow the participant of the smart device 110 to receive audio output from other participants of the meeting and/or transmit audio input of the participant to the other participants. When the meeting is run in person as well as remotely, the participant joining the meeting remotely and the smart device 110 may be in a remote location. Thus, in the user interface, the meeting client 112 may provide a video and/or audio interface of the meeting room for participants who joined the meeting in person. When the smart device 110 is associated with a location, the meeting client 112 may perform substantially similar operations and provide the user interface of the meeting to participants convened at the location (e.g., a video and/or audio output of a participant joining the meeting remotely, a video and/or audio output of another meeting room for further participants convening at a different location, etc.). The meeting client 112 may perform similar functions with respect to hosting project collaborations and the like.

In the exemplary embodiments, the profile repository 120 may include one or more profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the meeting summary system 100. For example, the profile repository 120 may be incorporated in the meeting server 130. Thus, access to the profile repository 120 by the meeting server 130 may be performed locally. In another example, the profile repository 120 may be incorporated in the smart device 110 (e.g., each smart device 110 has a profile repository 120 including at least the profile 122 of the participant who is respectively associated). Thus, access to the profile repository 120 and to a specific one of the profiles 122 may be performed through a transmission from the smart device 110. The profile repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the profiles 122 may be associated with respective members of a population of participants who may join meetings. The profiles 122 may be populated with information that is manually provided by the respective participants, endorsed by other participants, etc. The profiles 122 may also be populated with information that is automatically determined based on various types of available information such as an educational history, an employment history, etc. The profiles 122 may include any information related to the participants. For example, when the population is related to a corporation, the profiles 122 may include information indicating a job title, responsibilities of the job position, projects on which the participant is a part, a primary location of the position, a reporting hierarchy, etc. In another example, the profiles 122 may include information indicative of expertise in various fields, technical or non-technical. The technical expertise may be, for example, a technical discipline, a scientific practice, etc. The non-technical expertise may be, for example, organizational skills, leadership, public speaking, etc.

According to the exemplary embodiments, the profiles 122 may also be populated with role information. When embarking on a purpose, there may be particular roles that are assigned to various members of the purpose. During the course of the purpose, further roles may be assigned based on the needs of the purpose. The roles may have associated role interests such that the role of the participant may be performed properly. The role interests may relate to an explicitly provided and/or determined aspect that is linked to a role of the participant (e.g., regarding an aspect that pertains to a completion of a task linked to the type of role). When a purpose is created and/or during the purpose, the roles of each participant may be identified. For example, in a manual approach, the participants may provide the role information that identifies the one or more roles that a particular participant provides. In another example, in an automated approach, the roles of the participants may be automatically determined (e.g., by the meeting server 130). Accordingly, the profiles 122 may store the role information and any identified role interest associated with the one or more roles for each participant.

In the exemplary embodiments, the meeting server 130 may include a meeting program 132 and a summary program 134 and act as a server in a client-server relationship with the meeting client 112 as well as be in a communicative relationship with the profile repository 120. The meeting server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the meeting server 130 is shown as a single device, in other embodiments, the meeting server 130 may be comprised of a cluster or plurality of computing devices, working together or working independently. The meeting server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the meeting program 132 may be a software, hardware, and/or firmware application configured to host a meeting for the participants of the meeting. The meeting program 132 may host the meeting in a passive manner and/or an active manner. In the passive manner, the meeting may be performed at least partially in person. For example, there may be one or more meeting rooms at respective predetermined locations where one or more participants may convene at each location. The meeting program 132 may host an overall meeting by linking the one or more individual meeting rooms to other meeting rooms, both physical meeting rooms and electronic meeting rooms, to create a combined meeting room where all participants are part of the same overall meeting. When a physical meeting room is used, a smart device 110 may be at the location of the meeting room and associated therewith, instead of with an individual participant. In this manner, the meeting client 112 of this smart device 110 for the physical meeting room may be used in the server-client relationship with the meeting server 130. In the active manner, the meeting may be performed at least partially remotely. For example, a participant using the smart device 110 may utilize the meeting client 112 to remotely join the meeting. Thus, the meeting program 132 may create a respective electronic meeting room for each participant joining the meeting remotely. The meeting program 132 may link the electronic meeting rooms to the overall meeting. When more than one meeting room (e.g., physical or electronic) is used, the meeting program 132 may be configured to exchange video, audio, text, documentation data, etc. among the participants of the meeting.

The meeting program 132 may further be configured to record the meeting. For example, the meeting program 132 may record video, audio, or a combination thereof as from when the meeting starts until the meeting ends. As a result of the meeting being attended remotely by one or more participants, the meeting program 132 may record a stream from respective participants while the meeting is taking place. As a result of the meeting being attended in person at a set location, the meeting program 132 may record the location while the meeting is taking place. When the meeting is being attended remotely and/or when the meeting is being attended remotely and in person, the meeting program 132 may layer and/or organize the streams based on timestamps such that a playback of the meeting is as if the meeting were being watched in real time (e.g., audio playback from a first participant is inserted at a proper time relative to an overall running time of the meeting, displays of video streams of the participants are positioned in a grid type arrangement, etc.). In another example, the meeting program 132 may receive audio inputs from the plurality of participants, determine text conversions for the audio inputs, and generate a transcript of the meeting. In a further example, the meeting program 132 may determine any visual aids that were used during the meeting and include the visual aids or a link to access the visual aids (e.g., display the visual aid when viewing a video stream of the meeting, show a hyperlink to the visual aid at a time the meeting references the visual aid, etc.).

In the exemplary embodiments, the summary program 134 may be a software, hardware, and/or firmware application configured to monitor the meeting and generate a personalized meeting summary for each of the participants of the meeting. The summary program 134 may identify the participants of the meeting and generate a respective personalized meeting summary for each of the participants based on a respective role of each participant indicated in the profiles 122 included in the profile repository 120 as well as any other information that may be available or provided. For example, prior to the meeting and/or based on information determined while the meeting progresses, the summary program 134 may determine one or more role interests associated with the role of the participant. As will be described in further detail below, the summary program 134 may utilize the profiles 122, the role information, the role interests, and any other information in generating the personalized meeting summaries.

The summary program 134 may also determine tasks to be completed by each participant and include the tasks in the respective personalized meeting summaries. The summary program 134 may identify the various tasks that may arise as discussed during the meeting or may determine the tasks based on discussions in the meeting. For example, the summary program 134 may utilize natural language processing or other mechanism in which to extrapolate the tasks that may be discussed during the meeting by the participants. The summary program 134 may identify the participant to whom the task is to be assigned based on direct mention during the discussions or determining based on role information and role interests. In another example, the summary program 134 may determine the tasks that are not explicitly discussed during the meeting. Using, for example, historical information that defines the tasks that are to be accomplished for a given goal, the summary program 134 may be configured to identify the tasks.

The summary program 134 may further determine durations of the meeting that may be missed by each participant. For example, for any of a variety of reasons (e.g., an emergency arose at the meeting time slot, a prior meeting ran too long, the current meeting is running too long with a subsequent meeting to attend, etc.) a participant may miss the meeting, arrive to the meeting late, leave the meeting early, take an absence during the meeting (e.g., bathroom break), etc. For durations of the meeting that the participant is absent, the summary program 134 may determine when a particular participant is absent for a discussion in the meeting. The summary program 134 may summarize the durations that are missed by the particular participant and include the summary in the personalized meeting summary for the particular participant. The summary program 134 may further tailor the summary of the duration that is missed based on the role information and role interests (e.g., the discussion during a duration that is missed). For example, based on a threshold for relevance to the role information and role interests, the summary program 134 may determine whether to highlight or omit the summary for the durations that are missed.

The summary program 134 may be configured to perform the operations described above at various times. For example, the summary program 134 may perform the operations in real time. Thus, as the meeting progresses, the summary program 134 may monitor the meeting and process the discussions. In this manner, the summary program 134 may provide the personalized meeting summaries for each participant in a relatively short amount of time after the meeting. In another example, the summary program 134 may perform the operations in an offline capacity. Thus, when the meeting has concluded, the summary program 134 may process the discussions and generate the personalized meeting summaries to be made available at a time after the meeting ends. When the summary program 134 utilizes an offline approach, the summary program 134 may also incorporate any subsequent communications that may occur after the meeting has ended. For example, the summary program 134 may use email correspondences including further discussions from the meeting that are exchanged between participants.

The summary program 134 may provide a personalized meeting summary to each participant of a meeting based on factors specific to the participant's role and role interest. The summary program 134 may analyze a meeting from a perspective of each participant and build participant specific notes based on characteristics of the participant. For example, in addition to the role information and the role interests, the summary program 134 may generate a personalized meeting summary based on responsibilities, assigned tasks, a time a meeting is joined or attended, a conversation focus, etc.

According to an exemplary implementation of the exemplary embodiments, the summary program 134 may connect to a VoIP session or chat program in which a meeting is taking place. The summary program 134 may monitor the meeting as a spectator (e.g., a listening mode) in a real-time communication system (e.g., the meeting program 132 and the meeting clients 112 over the network 108). The meeting server 130 may utilize various application programming interfaces (APIs) related to the real-time communication system (e.g., web meeting APIs, VoIP endpoints, browser extensions, dial in bots, etc.).

The summary program 134 may utilize recorded meeting data (e.g., video, audio, documentation, etc.), a participant list, participant metadata (e.g., in the profiles 122) to build data elements. As noted above, the summary program 134 may perform these operations in real time or offline (e.g., before or after the meeting has taken place). The summary program 134 may extract various types of information from the above listed data. For example, for each discussion, the summary program 134 may determine a speaker, a date, a time, a topic or concept, a body, a sentiment, a dependency, an associated meeting, etc. The summary program 134 may correlate a speaker identification to a record of the participant's lines that are spoken during the meeting at specific times. The summary program 134 may associate a participant's lines with a corresponding one of the profiles 122 using various identification sources (e.g., a corporate directory). The summary program 134 may extract the date, the time, and the associated meeting from the metadata associated with the meeting. The information may be extracted from the meeting invitation from various sources. For example, the summary program 134 may use a calendar API, a web conference API, etc. that returns the relevant details (e.g., subject, name, UUID, participants, time, date, length, etc.). The summary program 134 may segment the meeting into unique segments based on when the participants contribute in the meeting. The summary program 134 may translate the unique segments into transcripts or bodies. The summary program 134 may determine a sentiment for each body such as through extraction of the topic and concept to determine a topic's sentiment and confidence using, for example, natural language processing. The summary program 134 may establish a timeseries dependency between each segment. The summary program 134 may establish a dependent flow based on each participant speaking. If multiple simultaneous participants speak, the summary program 134 may add each segment and participant to the same dependency. The summary program 134 may scan the transcript to determine references to a particular participant, role, role interest, responsibility, etc. The summary program 134 may use this information to identify the references and details flowing between participants.

With regard to the role information and the role interests, the summary program 134 may be configured to integrate the meeting data (e.g., the web conference data) with social profile data, communication data, etc. where the social profile data may be based on pulling role interests from various sources and the communication data may integrate with collaboration and social media communication services to federate the messages based on time and participant identification.

In creating the profiles 122, the summary program 134 may consume data from different sources to create a rounded profile specific to each participant. For example, the summary program 134 may identify participants of a meeting using a calendar invite through any mechanism that is capable of extracting this information. In another example, the summary program 134 may associate a participant with a role. The role may be pre-defined and/or custom for purposes of goals related to the meeting. The summary program 134 may create the profiles 122 such that the role is included with a basic description (e.g., typical responsibilities of a UX designer) that may be updated with additional responsibilities and/or tasks for the participant. The role information may be based on, for example, a basic search of a job role that compiles keywords, internal company descriptions, etc. The role may be maintained as a dictionary and/or ontology that identifies terms that prioritize discussed information. The role may be discovered using unsupervised learning to cluster the groups of terms and participants into a specific number of groups. The association with a role may be done using various APIs (e.g., human resources system API, professional website API, etc.) as well as an estimation based on prior messages and profile tags. The association with a role may be assigned based on a title extracted from a participant's email message footer. The association with a role may be done explicitly through an identification of a given role that may be provided manually. In a further example, the summary program 134 may monitor a given meeting based on the role and key words associated with that role and create a corresponding alert where the summary program 134 may continuously take objects and/or text that is recognized to be associated with the role. In yet another example, the summary program 134 may generate a useful and usable transcript with various perspectives where the perspective may be delivered in email or sent via other means at the end of the meeting or upon joining.

Figure 2:
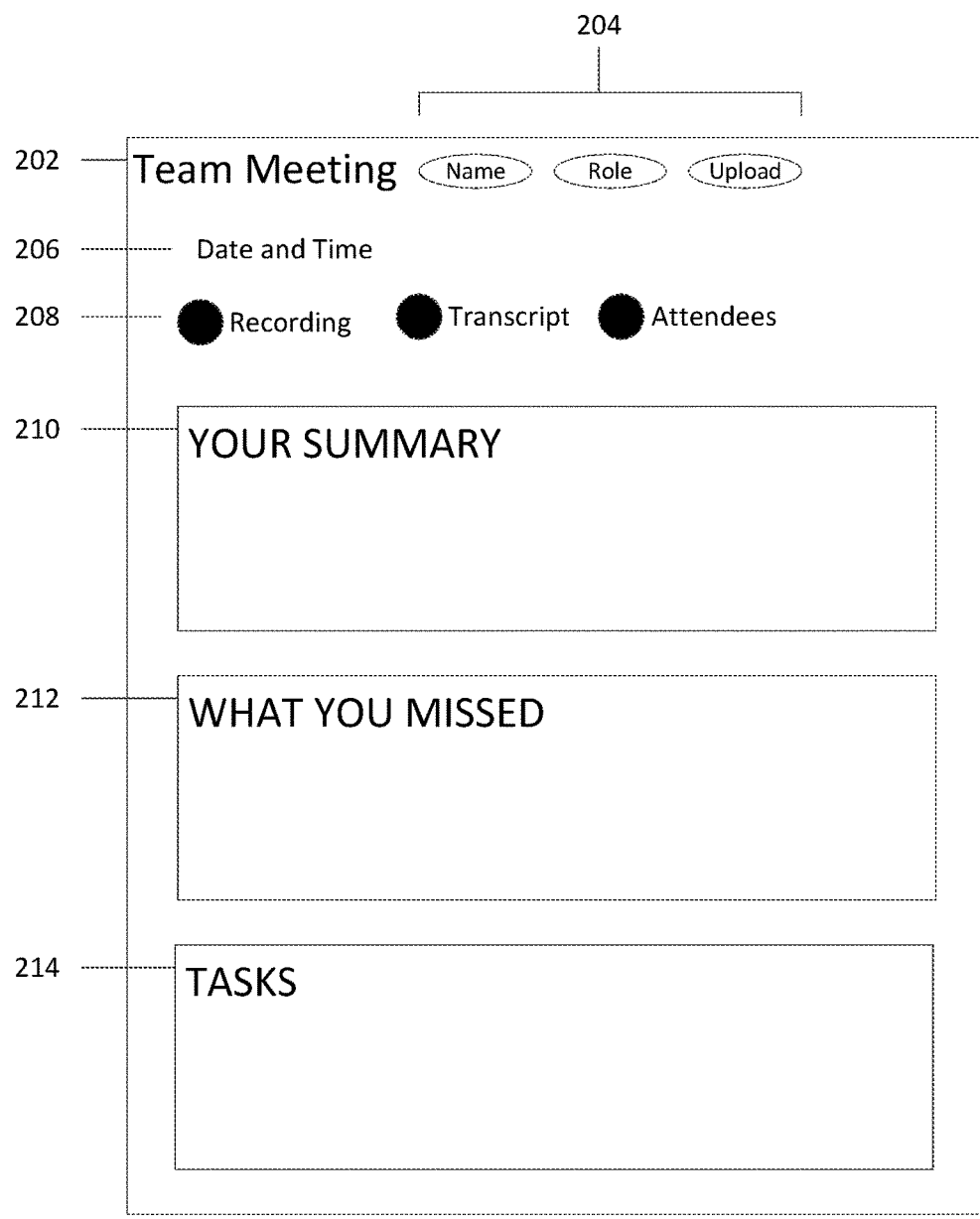
FIG. 2 depicts an exemplary user interface of a personalized meeting summary, in accordance with the exemplary embodiments.

As noted above, the summary program 134 may generate a personalized meeting summary for each participant of a meeting that includes different types of information that has been determined to be pertinent to the role of the participant. FIG. 2 illustrates an exemplary user interface 200 of a personalized meeting summary, in accordance with the exemplary embodiments.

In the exemplary embodiments, according to the implementation shown in the user interface 200, the user interface 200 may display various types of information. For example, as illustrated, the user interface 200 may include a title 202, descriptors 204, a time 206, hyperlinks 208, a summary section 210, a missed section 212, and a tasks section 214. The user interface may include further sections based on the types of information that is to be provided to the participants.

The title 202 may provide an indication of the meeting for which the personalized meeting summary relates. With a participant attending a plurality of meetings, the title 202 may identify which meeting for which the summary is directed. The descriptors 204 may provide different information with regard to the specific participant for which the personalized meeting summary is generated. For example, the descriptors 204 may include the participant's name, the participant's role, etc. As described above, the descriptors 204 may be manually provided by the participant and/or determined by the summary program 134. Should further descriptors 204 be required, the participant may modify the descriptors 204 through an upload option. The time 206 may indicate a date and time that the meeting was scheduled.

The hyperlinks 208 may provide access to various types of information related to the meeting. As described above, the meeting program 132 may record the meeting as a video recording, an audio recording, etc. Thus, the hyperlinks 208 may include an option to access the recording to be viewed by the participant. The meeting program 132 may also create a transcript of the meeting. Thus, the hyperlinks 208 may include an option to view the transcript. The summary program 134 may have identified the participants who attended the meeting. Thus, the hyperlinks 208 may include a list of participants or attendees of the meeting for which the personalized meeting summary is directed.

The summary section 210 may include a summary of the topics discussed during the meeting that relate to the role and role interests of the participant for which the personalized meeting summary relates. The summary program 132 may gauge whether various discussions during the meeting pertain to the role and/or role interests of the participant. For example, using natural language processing and determining a value linked to a topic, the summary program 132 may determine whether the value is at least a predetermined relevance threshold relative to the role and/or role interests of the participant. For those discussions that satisfy the threshold, the summary program 132 may include a summary of these discussions in the summary section 210. In a particular example, the summary section 210 may include deadlines for various aspects of a purpose for which the meeting was held. The deadlines may be for tasks that the participant performs and/or contributes based on the role and/or role interests.

The missed section 212 may include a summary of durations of the meeting that the participant for which the personalized meeting summary relates has missed. As described above, the participant may miss one or more durations of the meeting for a variety of reasons. When the meeting continues with discussions while the participant is absent, the summary program 134 may determine whether the discussions are related to the role and/or role interests of the participant. Thus, the summary program 134 may include a recap of the discussions during the missed durations so that the participant may be aware of what was discussed while absent.

The tasks section 214 may include one or more tasks that are to be completed by the participant for which the personalized meeting summary relates. As described above, the summary program 134 may be configured to determine various tasks that arise from the meeting based on the discussions arising in the meeting. Using explicit assignments made during the discussion and/or through determinations by the summary program 134 based on role and/or role interests and the discussions of the meeting, the summary program 134 may identify the tasks to be performed by the participant. The summary program 134 may include a list of the tasks so that the tasks are identifiably provided to the participant.

Figure 3:
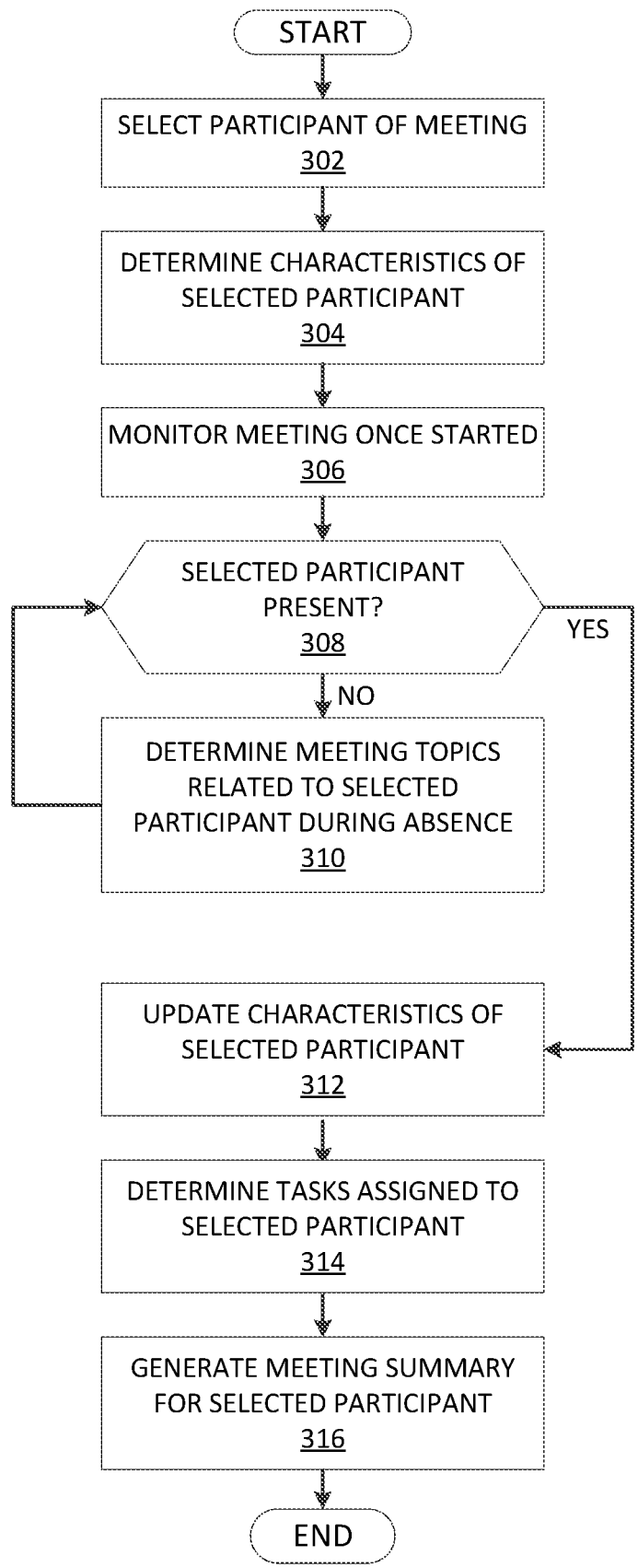
FIG. 3 depicts an exemplary flowchart of a method illustrating the operations of a summary program 134 of the meeting summary system 100 in generating a personalized meeting summary, in accordance with the exemplary embodiments.

FIG. 3 illustrates an exemplary flowchart of a method 300 illustrating the operations of the summary program 134 of the meeting summary system 100 in generating a personalized meeting summary, in accordance with the exemplary embodiments. The method 300 may relate to operations that are performed by the summary program 134 in a timeframe prior to, during, and subsequent to the meeting.

The summary program 134 may select a participant of a meeting (step 302). In a meeting, there may be at least two participants who attend a meeting in person or remotely. For each of these participants, the summary program 134 may be configured to generate a personalized meeting summary. For the selected participant, the summary program 134 may determine characteristics (step 304). The characteristics of the selected participant may be stored in the profiles 122 included in the profile repository 120. The characteristics of the selected participant as included in the profiles 122 may identify role information. The role information may identify a role that the selected participant plays in a purpose for which the meeting is being held. The role information may also identify role interests that include aspects that are related to or of interest to the type of role that the selected participant is related. As will be described below, the summary program 134 may determine the characteristics in a dynamic and/or ongoing manner as roles and/or role interests may become known at a later time (e.g., while the meeting progresses).

To further illustrate the operations of the delegation program 134, reference is now made to an illustrative exemplary embodiment. According to the illustrative exemplary embodiment, a participant in a meeting may be a UX designer. The profile 122 for the UX designer participant may include a basic job role that indicates that the participant designs screens for UIs, audits, exploratory designs, design guide standards, etc.

The summary program 134 may monitor the meeting once started (step 306). For example, the summary program 134 may determine when the meeting is scheduled (e.g., a date and a start time). The summary program 134 may monitor the meeting based on the start time of the meeting, independent of whether the selected participant has joined the meeting. In monitoring the meeting, the summary program 134 may record the meeting (e.g., video, audio, etc.), transcribe the discussions during the meeting, etc.

While monitoring the meeting, the summary program 134 may determine when a participant is present for the meeting (decision 308). For example, the participant may be entirely absent from the meeting, arrive late to the meeting, leave the meeting early, leave for a duration while the meeting progresses and subsequently returns while the meeting is still ongoing, etc. As a result of the participant being present (decision 308, "YES" branch), the summary program 134 may continue monitoring the meeting and perform subsequent operations when the meeting has concluded. As a result of the participant being absent (decision 308, "NO" branch), the summary program 134 may determine meeting topics and/or discussions that are brought up during durations that the selected participant is absent (step 310). The summary program 134 may track the one or more durations that the selected participant has missed for inclusion in the personalized meeting summary.

According to the previously introduced exemplary embodiment, the UX designer participant may arrive to the meeting 10 minutes late from being delayed by a prior meeting. The UX designer participant may remain for the remainder of the meeting during the scheduled timeslot. During these 10 minutes that the participant is absent, the other participants may discuss various topics where select topics may be related to the role and/or role interests of the absentee selected participant. Thus, the summary program 134 may take note of these durations specific to the UX designer participant.

As the meeting progresses and the summary program 134 monitors the meeting, the summary program 134 may update characteristics of the selected participant (step 312). For example, the characteristics may initially be identified based on information that has been gathered prior to the meeting (e.g., as indicated in the profile 122 of the selected participant). The summary program 134 may also extract information from communications related to the meeting or purpose to determine the role and/or role interests of the selected participant. However, during the course of the meeting, decisions may be made to add a role, remove a role, modify a role, etc. The role interests may also be explicitly provided or a context of discussions may provide insight to role interests related to a role type of the selected participant. Accordingly, the summary program 134 may update the role information with further information gathered from monitoring the meeting.

With reference again to the previously introduced exemplary embodiment, during the meeting, the participants may discuss various work items where the UX designer participant contributes to the discussions. The summary program 134 may process the work items being discussed. The summary program 134 may also process the discussions to which the UX designer participant contributes to determine role interests. In this manner, the summary program 134 may dynamically update the profile 122 of the UX designer participant of details specific to this participant and learn aspects of importance to the UX designer participant to be used in refining information to be included in the personalized meeting summary.

The summary program 134 may determine tasks assigned to the selected participant (step 314). Based on the role type and role interested included in the role information and through updating as the meeting progresses, the summary program 134 may determine the tasks to be performed by the selected participant. The summary program 134 may determine the tasks through natural language processing in which explicitly discussed tasks may be identified and/or tasks likely to be performed based on the discussions may be identified. For the tasks that are determined, the summary program 134 may determine select ones for which the selected participant contributes or performs.

Referring now to the previously introduced, illustrative exemplary embodiment, the summary program 134 may have determined the role type and the role interests of the UX designer participant. As the meeting progresses, the summary program 134 may have determined a plurality of tasks that are to be performed based on the discussions of the meeting. For example, with the role type of the UX designer, the summary program 134 may determine that the tasks for the UX designer participant is to complete an exploratory design for an upload feature, review stories for a first segment of the purpose, and audit work associated with a second segment of the purpose.

When the meeting has ended, the summary program 134 may generate a personalized meeting summary specific to the selected participant (step 316). As described above, the personalized meeting summary may include various types of information (e.g., title 202, descriptors 204, time 206, and hyperlinks 208). The personalized meeting summary may also include a summary section 210, a missed section 212, and a tasks section 214. In the summary section 210, the summary program 134 may generate a summary of the meeting for various aspects that are related to the role information. For example, the summary program 134 may determine the aspects based on a relevance value and a relevance threshold in which aspects having a relevance value that is at least the relevance threshold are included in the summary section 210. In the missed section 212, the summary program 134 may generate a summary of the discussion during durations that the selected participant missed. In a particular implementation, the summary program 134 may determine the aspects that are discussed and assign relevance values based on the role information. For aspects having a relevance value at least a relevance threshold, the summary program 134 may include these aspects in the missed section 212. The summary program 134 may use the same relevance threshold and determination of relevance values to determine the aspects included in the summary section 210 and the missed section 212. In an alternative embodiment, the summary program 134 may use different relevance values and relevance thresholds based on, for example, the selected participant, a role type, role interests, etc. For example, the summary program 134 may use a lower relevance threshold when the selected participant is a head of the meeting such that aspects discussed during durations that the selected participant missed is still reported to the selected participant. In the tasks section 214, the summary program 134 may list the tasks that are determined to be assigned to the selected participant.

With reference again to the illustrative exemplary embodiment, the summary program 134 may include various aspects into the summary section 210, the missed section 212, and the tasks section 214 for the UX designer participant. For example, in the summary section 210, the summary program 134 may determine that the discussions involved topics including a target functionality that allows a user to upload content in the first segment of the purpose, an estimated timeline of when an initial user research is completed, a deadline for when client feedback is to be received, an estimated timeline for when UI mock-ups are to be completed and provided to the team, and an estimated timeline for when an audit of the UI in a test environment is to be performed. These aspects may all have a relevance value that is at least the relevance threshold for the role type of UX designer. Accordingly, the summary program 134 may include this information in the summary section 210 in a summarized fashion. In another example, in the missed section 212, the summary program 134 may determine that the UX designer participant missed the first 10 minutes of the meeting. The summary program 134 may determine that the discussions involved tasks associated with the second segment of the purpose, an expected timeline of when stories for the second segment are to be completed by development and ready to audit, tasks to be included in the first segment of the purpose, assignment of tasks to the UX designer participant, and an estimated timeline of when competitor research is to be completed. These aspects may all have a relevance value that is at least the relevance threshold for the role UX designer. Accordingly, the summary program 134 may include this information in the missed section 212 in a summarized fashion. In a further example, in the tasks section 214, the summary program 134 may include completing an exploratory design for an upload feature, reviewing stories for a first segment of the purpose, and auditing work associated with a second segment of the purpose.

The exemplary embodiments are configured to generate personalized meeting summaries based on role information of each participant in the meeting. Based on the role information that includes a role type and role interests, the exemplary embodiments may determine aspects linked to the role information that are to be included in the personalized meeting summary. The exemplary embodiments may further be configured to determine durations that a participant is absent to provide a summary of discussions in these durations where portions of the discussions related to the role information is included. The exemplary embodiments are additionally configured to determine tasks arising from the meeting that are to be assigned based on the role type and role interests as indicated in the role information.

Figure 4:
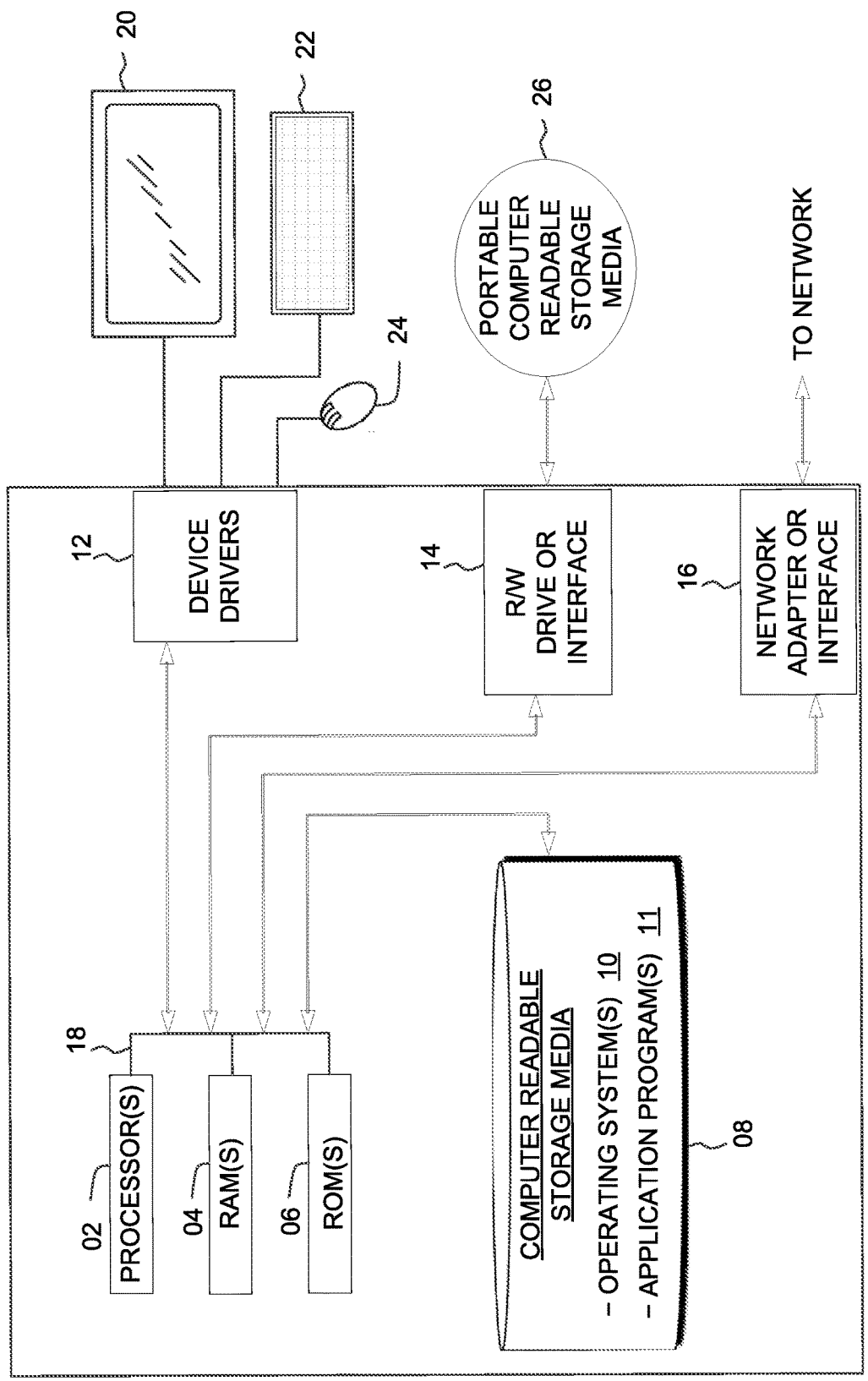
FIG. 4 depicts an exemplary block diagram depicting the hardware components of the meeting summary system 100 of FIG. 1, in accordance with the exemplary embodiments.

FIG. 4 depicts a block diagram of devices within the meeting summary system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
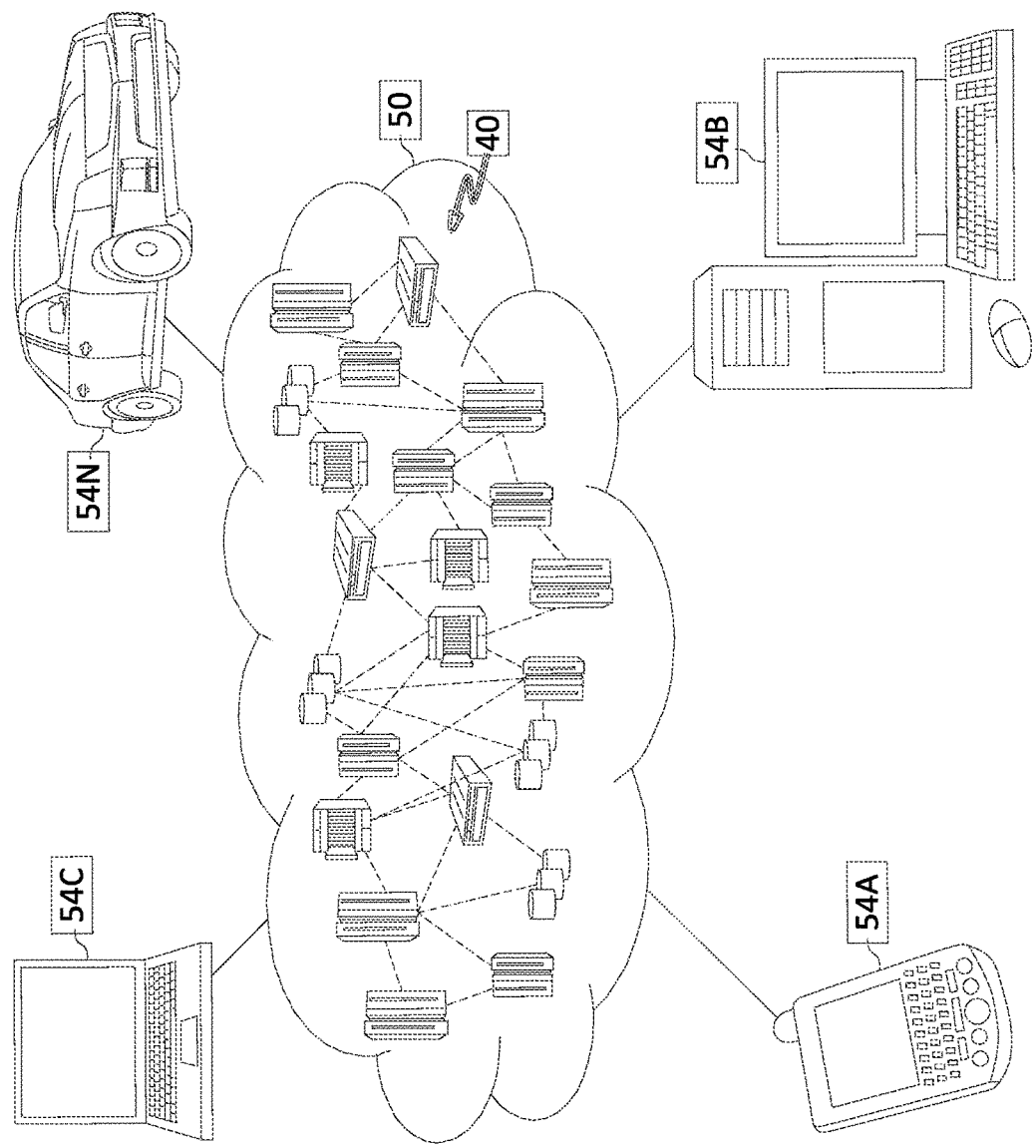
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
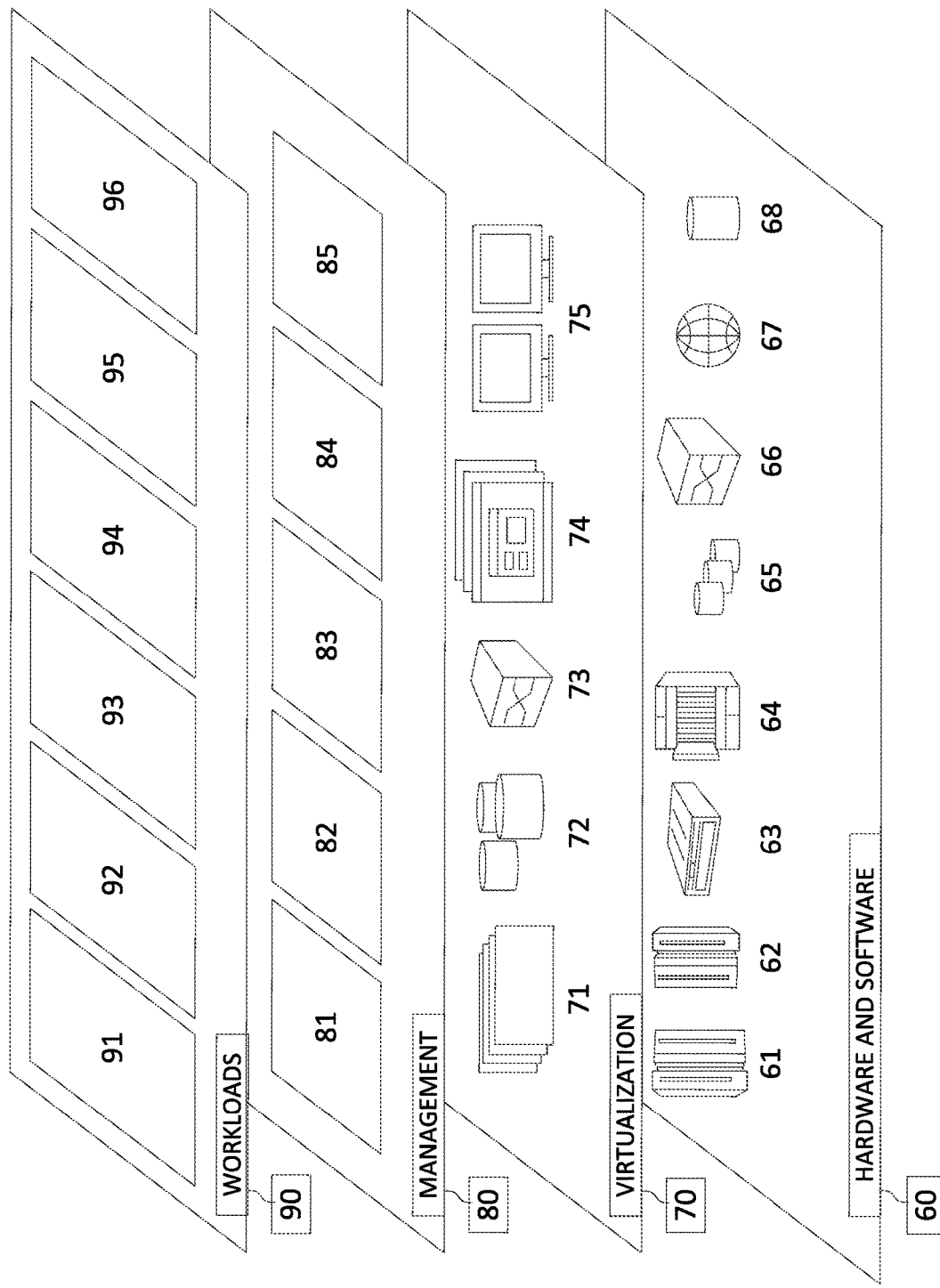
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and summary processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating personalized meeting summaries, the method comprising:
   identifying a participant attending a meeting associated with a purpose;
   determining role information of the participant, the role information indicating a role type that the participant provides toward the purpose;
   monitoring discussions of the meeting;
   determining portions of the discussions taking place at durations when the participant was absent;
   generating a personalized meeting summary for the participant, the personalized meeting summary including a summary section, the summary section comprising a missed section comprising select ones of the portions of the discussions taking place at the durations when the participant was absent that are directed to the role type of the participant; and
   transmitting the personalized meeting summary for viewing by the participant.

2. The computer-implemented method of claim 1, wherein the role information further indicates role interests, the role interests being linked toward tasks to be completed by the participant as the role type.

3. The computer-implemented method of claim 2, wherein the summary section includes further portions of the discussions that are directed to the role interests.

4. The computer-implemented method of claim 1, further comprising:
   determining tasks arising from the discussions of the meeting; and
   identifying select ones of the tasks that are associated with the role type of the participant.

5. The computer-implemented method of claim 4, wherein the personalized meeting summary further includes a tasks section listing the identified tasks.

6. The computer-implemented method of claim 1, further comprising:
   modifying the role information to include a further role type based on the discussions of the meeting.

7. A computer program product for generating personalized meeting summaries, the computer program product comprising:
   one or more non-transitory computer-readable storage media and program instructions stored on the one or more non-transitory computer-readable storage media capable of performing a method, the method comprising:
   identifying a participant attending a meeting associated with a purpose;
   determining role information of the participant, the role information indicating a role type that the participant provides toward the purpose;
   monitoring discussions of the meeting;
   determining portions of the discussions taking place at durations when the participant was absent;

generating a personalized meeting summary for the participant, the personalized meeting summary including a summary section, the summary section comprising a missed section comprising select ones of the portions of the discussions taking place at the durations when the participant was absent that are directed to the role type of the participant; and transmitting the personalized meeting summary for viewing by the participant.

8. The computer program product of claim 7, wherein the role information further indicates role interests, the role interests being linked toward tasks to be completed by the participant as the role type.

9. The computer program product of claim 8, wherein the summary section includes further portions of the discussions that are directed to the role interests.

10. The computer program product of claim 7, wherein the method further comprises:

determining tasks arising from the discussions of the meeting; and identifying select ones of the tasks that are associated with the role type of the participant.

11. The computer program product of claim 10, wherein the personalized meeting summary further includes a tasks section listing the identified tasks.

12. The computer program product of claim 7, wherein the method further comprises:

modifying the role information to include a further role type based on the discussions of the meeting.

13. A computer system for generating personalized meeting summaries, the computer system comprising:

one or more computer processors, one or more computer-readable storage media, and program instructions stored on the one or more of the computer-readable storage media for execution by at least one of the one or more processors capable of performing a method, the method comprising:

identifying a participant attending a meeting associated with a purpose;

determining role information of the participant, the role information indicating a role type that the participant provides toward the purpose;

monitoring discussions of the meeting;

determining portions of the discussions taking place at durations when the participant was absent;

generating a personalized meeting summary for the participant, the personalized meeting summary including a summary section, the summary section comprising a missed section comprising select ones of the portions of the discussions taking place at the durations when the participant was absent that are directed to the role type of the participant; and transmitting the personalized meeting summary for viewing by the participant.

14. The computer system of claim 13, wherein the role information further indicates role interests, the role interests being linked toward tasks to be completed by the participant as the role type.

15. The computer system of claim 14, wherein the summary section includes further portions of the discussions that are directed to the role interests.

16. The computer system of claim 13, wherein the method further comprises:

determining tasks arising from the discussions of the meeting; and identifying select ones of the tasks that are associated with the role type of the participant.

17. The computer system of claim 16, wherein the personalized meeting summary further includes a tasks section listing the identified tasks.

\* \* \* \* \*